Patented Feb. 5, 1946

2,394,083

UNITED STATES PATENT OFFICE 2,394,083

SURFACE ACTIVE AGENTS

Mark Lintz, San Francisco, Calif.

No Drawing. Application May 18, 1943,
Serial No. 487,491

5 Claims. (Cl. 210—23)

My invention relates to the modification of characteristics of finely divided solid matter suspended in a liquid. This modification results in the increase in flocculation of the solid particles. Suspensions of this nature occur in different industries and are variously known as "slurries," "slimes," "residues," "mud," and the like, and they will hereinafter be referred to generically as "slurry." Slurries occur, for example, in the treatment of ores or other solid substances involving grinding them to fine sizes and suspending them in water or solution, by precipitation of salts from solution, and also from other types of treatment. Settling, filtering, flotation, or the like, are often used to separate slurries into their component solids and liquids.

Different slurries settle at different speeds, that is the suspended solids settle to the bottom of the liquid medium, some very quickly, others more slowly and others very slowly or only inappreciably. Some slurries can be separated by filtration into their component solids and liquids more easily than others, the more quickly settling slurries being generally the more easily filterable. The rate of settling, the filterability, the flotability, and the like, seem to be dependent on a physical surface phenomenon which may be affected by the particular type of solid, the particular type of liquid, the presence of other substances, the form in which the material is present, the hydrogen ion concentration, the temperature, and perhaps by some other condition of operation. Each specific slurry seems to have its own characteristics although at times there may be certain degrees of similarity between them.

Where separation of the slurry solids and liquids is desired, it is often speeded by the presence of certain substances. Some substances have a tendency to hasten the settling or increase the filterability of certain slimes, apparently by causing the collection of the very fine particles of solids into larger flocks, or otherwise. These are designated "flocculators," "flocculating agents," or "flocculants." Others slow down the rate of settling or decrease the filterability apparently by making the solids present more dispersed throughout the liquid, and are designated "dispersing agents" or "dispersants." Flocculants and dispersants seem to exercise their functions by modifying the surface phenomenon or action or effect. What is a flocculant or a dispersant for one particular slurry may be the reverse for another, and what is a flocculant or dispersant for one particular slurry may be the reverse for the same slurry on changing one or more of the conditions of operation.

A fairly large number of surface active agents have heretofore been proposed, and these can generally be divided into the two classes of electrolytes and colloids, and it will appear hereinafter that the present invention belongs to the latter class. Some slurries respond more or less to the different known agents, but there are some slurries that respond very little to any known agent or technique, and they remain difficult to settle or filter. Such refractory slurries, when attempts are made to settle them, require large areas in the thickener equipment with a considerable increase in cost, perhaps enough to avoid any chance of economic processing.

Objects of this invention include the production of surface active agents which can be easily, quickly and economically prepared; which are very effective on slurries that have not responded well to previously proposed agents; which are more effective than previously proposed agents on slurries that have responded to such previously proposed agents; and other objects will become apparent on reading this specification.

The new surface active agent may be prepared by water extraction of four (4) parts of ground flax seed (linseed) in one hundred (100) parts of water. these parts and any hereinafter mentioned being by weight, and the resulting extract has desired, improved surface active effects on slurries. Linseed meal, namely, the residue left after linseed oil has been removed by either the hot or cold methods may be substituted for the ground linseed itself and has the advantage of being a cheaper material. The extraction may be at any convenient temperature. It may be by standing at room temperature, preferably but not necessarily with at least occasional stirring for a period of time sufficient to obtain enough of the surface active agent in the extract for industrial purposes. Forty-eight (48) hours is generally more than enough, and a shorter period of time, say twenty-four (24) hours will generally suffice. Forty-eight (48) hours is preferred as a matter of safety in order to obtain the maximum amount of surface active agent easily obtainable in the extract. Heat speeds the extraction, the period of time being less the higher the temperature. Boiling at atmospheric pressure for one (1) hour is sufficient. Hot extraction is thus usually preferred, although cold extraction may be preferred under certain conditions. The proportion of linseed or linseed meal to water may be varied at will, provided that a large enough proportion of water is present to effect a good extraction and that so large a proportion of water is not present as to result in an unduly large volume to be handled. The proportion of water, also, should be large enough to maintain the desired characteristics of the extract. For example, an extract of ten (10) parts of linseed meal in one hundred (100) parts of water becomes quite viscous and gel-like on cooling to ordinarily existing natural temperatures, but solutions dilute enough to be fluent at such temperatures are more convenient for handling. Four (4) parts of meal to one hundred (100) of water provides an easily handled extract which works well. The proportion of linseed meal to water can be decreased or it can be increased very much. If the resulting extract is normally a gel at room temperature, the extraction can be hot or by boiling, and the extract can be diluted before it cools and gels. Where there is no objection to the presence of the linseed shells and residues, they may be left in the extract which is the active portion. Otherwise these solids may be removed by settling or by screening out the coarse particles, leaving a cloudy fluid which may be used as such. Such an extract is highly effective not only with respect to slurries which settled or filtered easily with or without the presence of known surface active agents, but also with respect to refractory slurries which do not respond, or only to a slight degree, thereto.

The extract functions satisfactorily when freshly prepared, but after ten (10) to twenty-four (24) hours grayish yellow flocks may appear therein and the viscosity of the extract may drop considerably. This may be an indication that the effectiveness of the material has been reduced. In order to avoid any decomposition which might have a harmful effect on the surface active properties, it is preferred generally to use an extract which is not too stale. However the appearance of the flocks therein and the lowering of the viscosity thereof are generally indications that there has been a decrease in effectiveness. The decomposition can be retarded by addition of small quantities of phenol, formaldehyde or other effective preservative.

Cotton seed, cotton seed meal and seeds or seed meals other than linseed or cotton seed, beets or sugar beet pulp which is the residue left after extracting sugar from sugar beets, orange skins, apples, other pectin or pectin-yielding substances can be treated in the same manner as linseed or linseed meal, as described above, to obtain an extract which will function similarly to the linseed or linseed meal extract with respect to the surface active properties.

While all of the above-mentioned substances can be well extracted with water alone to produce a satisfactory surface active agent, a more concentrated extract can be made, a better agent results, and less insoluble residue remains if the extracting water is made alkaline. For alkaline extraction of linseed meal, twenty (20) pounds thereof are stirred gradually into one hundred (100) pounds of water so that it does not cake. Such proportions will produce a stiff paste. Four (4) pounds of solid sodium hydroxide are added, and the whole is stirred until the sodium hydroxide has all dissolved. This may require about thirty (30) minutes, more or less, depending on the size of the pieces of sodium hydroxide added. The mixture may be allowed to stand at room temperature, to cause extraction, for forty-eight (48) hours. The extract may thereafter be diluted for use, with or without first separating out the coarser solid particles as described above. Extraction may be effected for a longer or shorter period of time or with a larger amount of water present, or with the application of heat. The proportion of sodium hydroxide to material to be treated as given above is preferred not only for linseed meal but also for the other raw materials herein mentioned. Such proportion may however be varied. Sodium carbonate, potassium hydroxide, potassium carbonate, or other alkalies may be used, alone or mixed, in equivalent proportions, to replace the sodium hydroxide in whole or in part. The sodium hydroxide is however generally preferred.

The new agent speeds the settling of slurries that can eventually settle at least fairly well without the aid of a flocculant; it also causes a faster settling than was caused by previously known flocculants; and it causes refractory slurries, which previously could be made to settle only very slowly or not at all, to settle faster than previously. Among its advantages are that it makes refractory slurries settle, and substantially reduces the cost of settling equipment and the space required for it.

One of the applications of the present invention is in the treatment of manganese ores. In the working of such ores it is often desirable to leach comminuted ores containing manganese dioxide with an aqueous solution of sulphur dioxide with or without the presence of other substances, which converts manganese oxides and perhaps other manganese compounds present into manganese sulphate. The resulting pulp contains a solution consisting essentially of manganese sulphate and of an insoluble residue consisting largely of silica, silicates, and iron and perhaps other oxides insoluble in the leaching medium. This solution may be very strong and even saturated, with a content as high as one hundred fifty (150) grams of manganese or four hundred eight (408) grams of manganese sulphate per liter. The acidity of such solution may lie between a pH of about five-tenths (0.5) and that at which basic manganese compounds, perhaps hydroxide or basic sulphate, will precipitate out of the solution, namely at a pH of about six and two-tenths (6.2). The hydrogen ion concentration of the solution is thus always on the acid side. The solution, due to its concentration, is a different kind of medium than water or even a dilute solution; and it is a highly buffered solution.

The solution made from one (1) pound of linseed meal, and in fact that made from one (1) pound of any of the other desirable materials mentioned above, will cause satisfactory settling of from four hundred to two thousand (400 to 2000) pounds of the solid residue present in the pulp resulting from the leaching of the manganese ore as referred to above. It is a rough general rule that the amount of a certain flocculant needed to cause a certain slurry to settle at a certain rate is proportional to the surface area of the suspended matter therein to be settled. This affords a rough method of determining a priori how much of such flocculant should be used to cause settling of another slurry at the same rate. Observations can be made to determine more or less roughly the surface areas of the suspended solids in the two slurries, namely the one which settles satisfactorily and the one which does not, and a proportionate amount of extract should be used. A rough but useful approximation of the amount of extract to be used for even a different kind of slurry can be calculated in the same way. It may however be more expedient at times to determine experimentally the amount of extract to be used, particularly when it is a quicker method.

Another example of a slurry that can be settled by the new surface active agent as near the neutral point (pH=7) is cement slurry. Modern cement raw grinding practice tends towards closed circuit grinding, and it is necessary to thicken the mill product. The slurry from a large cement mill having a dilution of eight to one (8 to 1) was settled to a calculated settling area of four and two-tenths (4.2) square feet per ton of solids per twenty-four (24) hours with three and four-tenths (3.4) pounds of my reagent per ton of solids, against a surface area of twenty-four and six-tenths (24.6) square feet per ton of solids per twenty-four (24) hours with the known prior art flocculator for the material using ten and three-tenths (10.3) pounds of flocculator per ton of solids.

A kaolin clay in a water suspension with a dilution of ten to one (10 to 1) from a washing step to remove sand is an example of the clay group which can be settled by the new surface active agent. A test cylinder treated with three (3) pounds per ton of the linseed as extract per ton of solids settled to a final density in thirty-three (33) minutes, while the control with no reagent took one hundred ten (110) minutes to settle to the same density. A cotton seed extract took fifty-six (56) minutes, and a sugar beet residue extract took sixty-four (64) minutes. Aluminum sulphate is commonly used for settling clays. Added at the rate of three (3) pounds per ton of solids to be settled to the same density as the other tests required seventy-two (72) minutes. All of these tests were made on different samples of the same clay slurry and under the same conditions of operation.

A heavy iron copper sulphide ore ground to two hundred (200) mesh settled to a final density in sixty-four (64) minutes without any flocculating agent. A sample of the same material, treated with two (2) pounds of the linseed meal extract per ton of solids, settled to the same density as the control in thirty (30) minutes.

The settling of magnesium hydroxide precipitated from sea water by calcium hydroxide is an example of the flocculation of precipitated solids and the efficacy of my reagent in alkaline solutions. The magnesia slurry having a pH of ten and six-tenths (10.6) coming from the reactor tank of a large commercial plant was taken for test. A one thousand cubic centimeter (1000 cc.) sample settled to a final density in sixty-two (62) minutes. When treated with three (3) pounds of linseed meal extract per ton of solids in the sample, it settled to the same density in fifteen (15) minutes, or a settling rate of nine and five-tenths (9.5) feet per hour against one and eighteen-hundredths (1.18) feet per hour in the control.

The extracts mentioned above are useful as flocculants for both acid and alkaline slurries. One of their outstanding characteristics is their great indifference to the hydrogen ion concentration (pH) of the slurry to be treated, which is a great advantage over other reagents which cannot be used at all or are ineffective except within a short pH range. The new extracts thus become very useful in a counter current decantation circuit for washing out or displacing an acid or an alkaline solution from a slurry.

Reference has been made above to improved settling. This is due to improved flocculation which also generally results in improvement in filtering corresponding to the improvement in settling. An example thereof is the filterability of a cement slurry which has been thickened to a solids content of thirty-five percent (35%). This, filtered without the addition of a surface active agent, resulted in a deposit of one hundred forty-eight and eight-tenths (148.8) grams of solids per minute cycle on a unit filter leaf. The addition of a linseed extract made according to this invention, in the proportion of one and three quarters (1¾) pounds per ton of solids, resulted in a twenty-four percent (24%) increase in the amount of deposited solids in the same time and on the same unit cycle, the amount of solids deposited being one hundred eighty-four and four-tenths (184.4) grams. This twenty-four percent (24%) increase in filterability is very much greater than that caused by the next best flocculator for the purpose, namely lime, which increased the filterability seven and six-tenths percent (7.6%). Products made according to this invention are also used in flotation. As an example, mill slurries containing talc and clay gangue in a sulphide ore and treated with the new surface active agent, resulted in the production of very clear concentrates by flotation, where recoveries by flotation without the use of a flocculant were difficult.

Other uses for the products of this invention will suggest themselves. Certain details have been referred to for the purpose of describing the invention without limiting it, since such details may be varied without departing from the spirit thereof.

I claim:

1. Process for the flocculation of a finely divided solid in an aqueous suspension thereof consisting in dispersing in said aqueous suspension, as the effective flocculator, a small amount, compared to the weight of solids present in suspension, of a material selected from the group consisting of a water solution of the water soluble portion of linseed and an alkaline solution of the alkali soluble portion of linseed.

2. Process for the flocculation of a finely divided solid in an alkaline aqueous suspension thereof consisting in dispersing in said alkaline aqueous suspension, as the effective flocculator a small amount, compared to the weight of solids present in suspension, of a material selected from the group consisting of a water solution of the water soluble portion of linseed and an alkaline solution of the alkali soluble portion of linseed.

3. Process for the flocculation of a finely divided solid in an aqueous slurry of a clay consisting in dispersing in said slurry, as the effective flocculator, a small amount, compared to the weight of solids present in the slurry, of a material selected from the group consisting of a water solution of the water soluble portion of linseed and an alkaline solution of the alkali soluble portion of linseed.

4. Process for the flocculation of a finely divided solid in an aqueous slurry of a cement consisting in dispersing in said slurry, as the effective flocculator, a small amount, compared to the weight of solids present in the slurry, of a material selected from the group consisting of a water solution of the water soluble portion of linseed and an alkaline solution of the alkali soluble portion of linseed.

5. Process for the flocculation of a finely divided solid in an aqueous slurry of magnesium hydroxide consisting in dispersing in said slurry, as the effective flocculator, a small amount, compared to the weight of solids present in the slurry, of a material selected from the group consisting of a water solution of the water soluble portion of linseed and an alkaline solution of the alkali soluble portion of linseed.

MARK LINTZ.